(12) United States Patent  
Renzetti

(10) Patent No.: US 6,564,494 B2  
(45) Date of Patent: May 20, 2003

(54) FLY TYING VISES

(75) Inventor: Andrew Renzetti, Titusville, FL (US)

(73) Assignee: Renzetti, Inc., PA (US)

( * ) Notice: Subject to any disclaimer, the term of this patent is extended or adjusted under 35 U.S.C. 154(b) by 0 days.

(21) Appl. No.: 09/894,304

(22) Filed: Jun. 27, 2001

(65) Prior Publication Data

US 2003/0000124 A1 Jan. 2, 2003

(51) Int. Cl.[7] .............................................. B21C 47/02
(52) U.S. Cl. ............................. 43/1; 242/446; 242/448
(58) Field of Search ........................... 43/1; 74/53–59, 74/122, 124, 125, 567; 242/446, 448

(56) References Cited

U.S. PATENT DOCUMENTS 4,198,872 A * 4/1980 Metz ............................. 74/57
5,169,079 A * 12/1992 Renzettii ................... 242/7.19
5,667,283 A * 9/1997 Drennen et al. ............ 303/152

* cited by examiner

*Primary Examiner*—Charles T. Jordan
*Assistant Examiner*—Bret Hayes
(74) *Attorney, Agent, or Firm*—Eugene E. Renz, Jr.

(57) ABSTRACT

A device for rotating the shack of a fishhook about its axis comprising a mandrel rotatable about a predetermined axis of rotation, a base which includes means for rotatably mounting said mandrel, a first shaft extension, and means for pivotally mounting said first shaft extension on one end of said mandrel, said first shaft extension having a shaft axis which intersects the axis of rotation of said mandrel and is repositionable relative thereto clamping means mounted on an outer end of said first shaft extension comprising jaws for gripping said fishhook a rotatable cam have a spiral cam surface which engage confronting spherical surfaces on the confronting interfaces of the jaws whereby rotation of said cam in one direction causes the jaws to close and rotation of cam element in the opposition element causes the tips of the jaws to open.

3 Claims, 3 Drawing Sheets

FLY TYING VISES

FIELD OF THE INVENTION

The present invention relates to tying vises and more specifically to an improvement in the mechanism for holding a fishhook in the jaws of such a device.

BACKGROUND OF THE INVENTION

Fly tying vises are not new per se. Typical of the prior art fly tying vises to which the present invention relates are those shown in the prior Renzetti U.S. patents listed below.

a) Renzetti U.S. Pat. No. 4,169,562 b) Renzetti U.S. Pat. No. 5,169,079

These vises typically comprise a base and an upstanding adjustable height beam extending up from the base, a rotary shaft mounted at the upper end of the height beam which has an offset portion mounting a jaw assembly for supporting a hook positioning the shank portion of the hook coaxial with the rotational axis of rotary shaft thereby permitting the creation of a precision fly.

In the Renzetti '079 patent, the tips of the jaw assemblies are normally biased to an open position by spring means and can be adjusted to grip a fish hook by a rotatable cam element having continuously tapered planar surfaces which mate and confront complementary planar cam follower surfaces on the jaws opposite the tip ends to provide a surface to surface contact between the cam surfaces and the follower surfaces on the jaws. By this arrangement, the spread or distance between the tips of the jaws may be selectively adjusted between an open position spaced apart an adequate distance to permit insertion of a hook and a closed, locked position by rotating the cam to close the jaws to firmly grip the hook for the fly tying operation.

Even though the Renzetti '079 patent shows a system which functions well for the purposes intended, the precision required to make the inter-engaging cam surfaces and the jaw follower surfaces are rather costly.

With the foregoing in mind, it is therefore an object of the present invention to provide a fly tying vise generally similar to that described in the Renzetti '097 patent having an improved system for adjusting the distance between the tips of the jaws which is considerably more economical to make.

SUMMARY OF THE INVENTION

With this in mind, in accordance with the present invention, the inner end of each of the jaws is provided with a spherical projection which provides a line contact with the planar rotary cam surfaces. In accordance with another embodiment of the invention, the confronting faces of the terminal ends of the jaws are provided with pockets for spherical rolling elements which function as cam followers and engage the planar surfaces of the rotatable cam element. It has been found that this arrangement is much more economical to machine.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENTS

Figure 1:
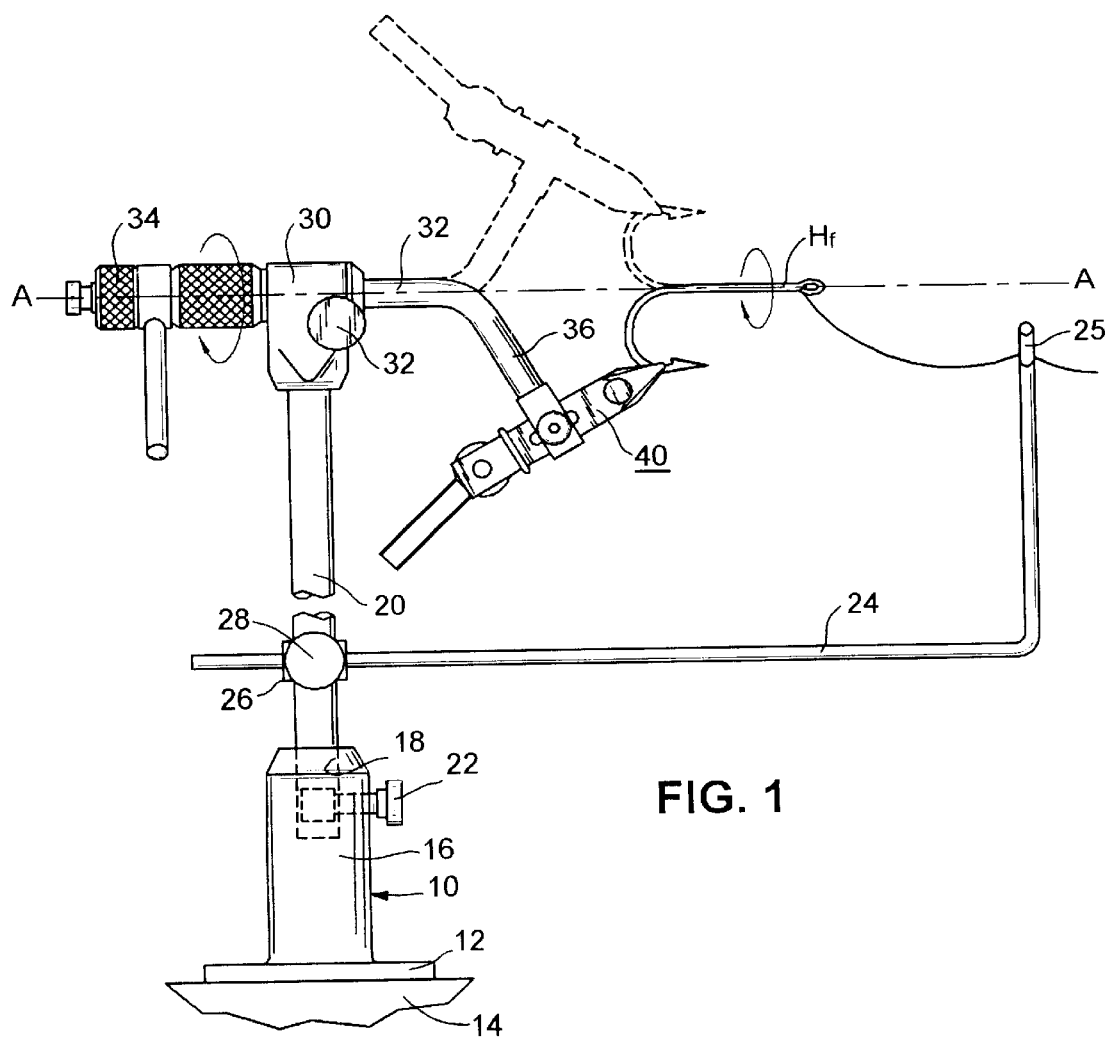
FIG. 1 is a side elevational view of my improved fly tying vise incorporating features of the present invention.
Figure 2:
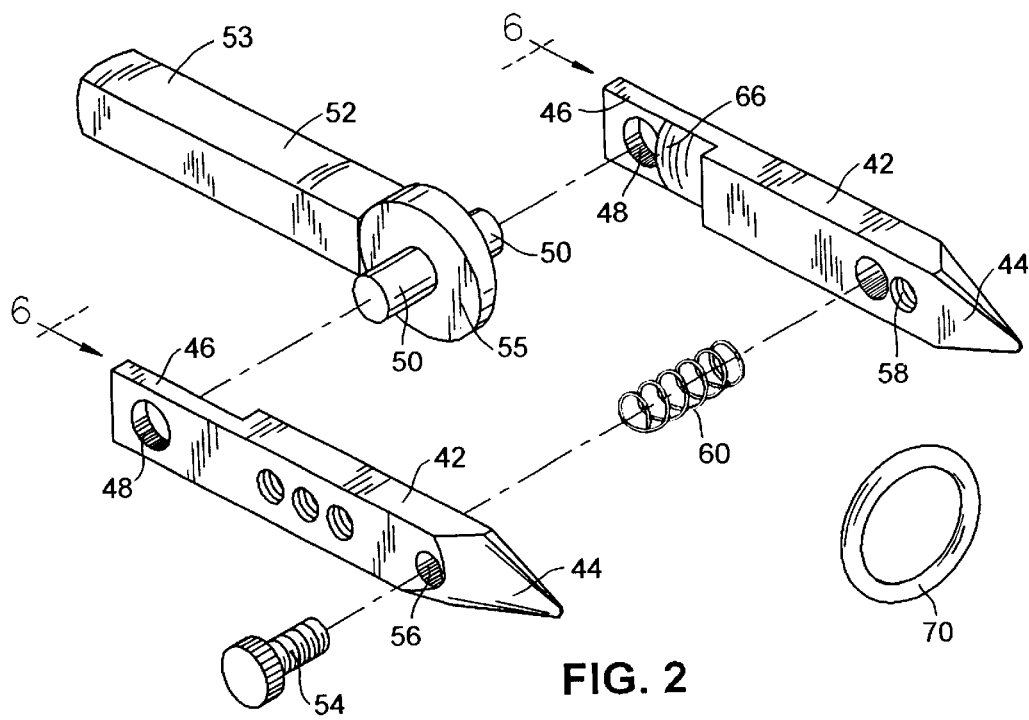
FIG. 2 is an exploded perspective view of one embodiment of hook-holding jaws and cam arrangement in accordance with the present invention.
Figure 3:
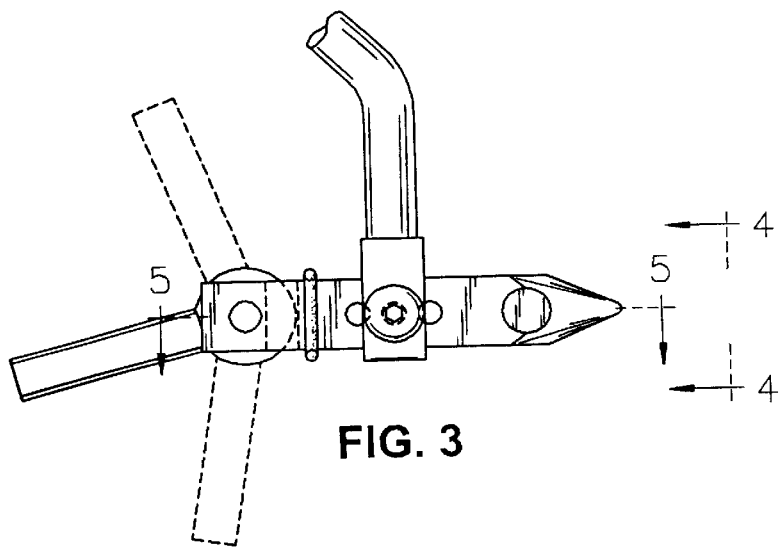
FIG. 3 is a side elevational view showing the arm for actuating the cam in various positions.
Figure 4:
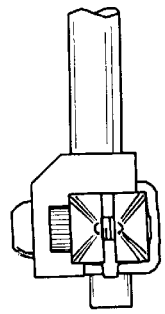
FIG. 4 is a front elevational view as viewed on lines 4—4 of FIG. 3.
Figure 5:
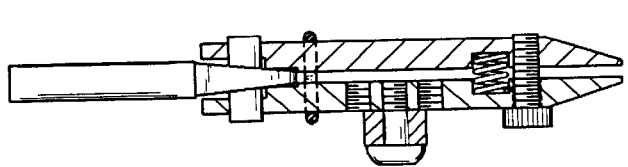
FIG. 5 is a transverse sectional view of the jaws and cam taken on lines 5—5 of FIG. 3.
Figure 6:
FIG. 6 is an end elevational view showing the one embodiment of cam follower for a fly tying vise in accordance with present invention.
Figure 7:
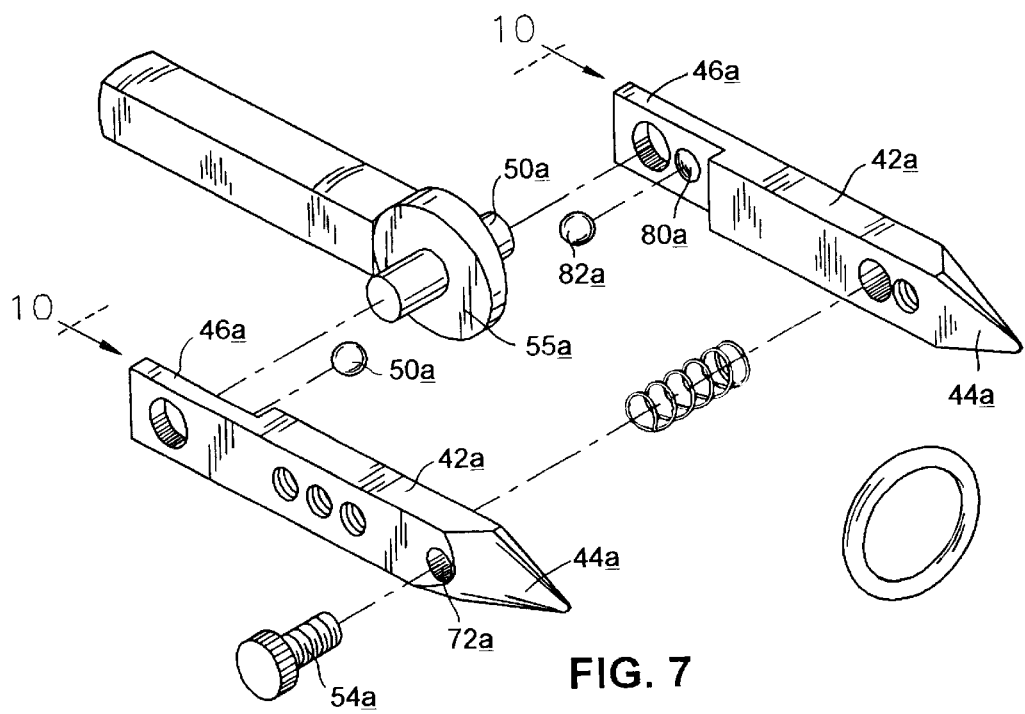
FIG. 7 is a perspective view showing the jaws, cam and other components of another embodiment of hook-holding jaw arrangement in accordance with the present invention.
Figure 8:
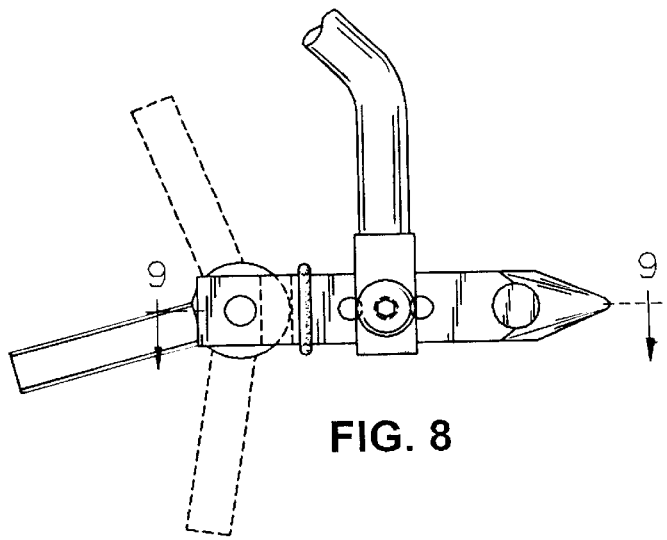
FIG. 8 is a side elevational view showing the handle for actuating the cam in different operating positions.
Figure 9:
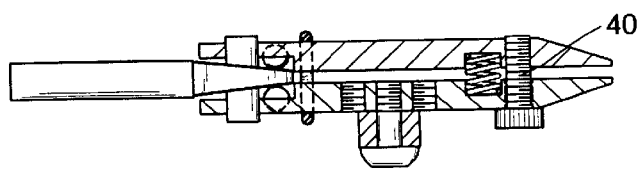
FIG. 9 is a transverse sectional view showing the jaws, cam and cam follower of the present invention.
Figure 10:
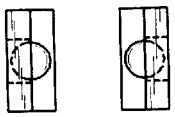
FIG. 10 is an end elevational view of the jaws for this embodiment of the invention.

Referring now to the drawings and particularly FIG. 1 thereof, there is shown a fly tying device incorporating the present invention which is generally designated by the numeral 10. The basic elements of the device are not new per se. However, the present invention is directed to the particular configuration of the jaws for holding a fishhook in the device during a fly tying procedure and specifically to a new and improved cam follower arrangement.

Thus, the device includes a base 12 which can be mounted to a table top or the like 14 so that the fly tying vise is stable during a fly tying procedure. The base 12 includes an upstanding vertical support 16 having an opening 18 for an adjustable height beam 20 supported in the base by a clamp screw 22 which allows for disassembly of the base and beam 20 to store the fly tying device when not in use.

A thread cradle 24 is mounted on the beam 20 for vertical adjusting movement thereon by means of a mounting block 26 and clamp screw 28. The cradle 24 is adjustable for selectively positioning the location of the hanger 25 relative to the fishhook in the manner shown in FIG. 1. A support head 30 is mounted on the upper end of the beam 20. A shaft 32 rotatable about its longitudinal axis is coupled to clutch means 34 for rotating the shaft in one direction about the longitudinal axis A—A. As shown, the shaft 32 and clutch means 34 mounted on the adjustable height beam 20. The shaft 32 has a downwardly extending portion 36 disposed at an angle to the longitudinal axis A—A of the shaft. A hock clamping means broadly designated by the numeral 40 is mounted at the end of the angularly extending shaft portion 36. The clamping means includes a pair of hook engaging jaws 42. Accordingly, when a fishhook $H_f$ is held in the clamping jaws 42 at the outer terminal end of the shaft extension, the hook is supported so that the shaft or fishhook is in alignment with the axis A—A. In this position, rotation of the handle in the direction shown by the arrow causes the fishhook to rotate about the axis A—A.

There is shown in FIGS. 2–6 inclusive a first embodiment of jaw assembly in accordance with the present invention. As illustrated therein, the jaws 42,42 are of elongated generally rectangular shape having pointed tips 44,44 at one end which are adapted to clampingly engage the fishhook $H_f$ in the manner shown in the drawings. The rear terminal confronting inner faces of the jaws 42,42 are undercut as at 46 to define a shelf. The undercut portions have aligned openings 48 for mounting the stub shafts 50, 50 of a cam-handle actuator assembly 52 having a handle 53 connected to the periphery of a disc-like cam 55. The jaws are normally held in a closed position by an adjustable clamping screw 54 which engages through an opening 56 adjacent the tip portion of the jaws and threads into a tapped opening 58 in the opposing jaw member. A spring 60 normally biases the tips to an open position.

In the present instance, cam followers in the shape of confronting semi-cylindrical protrusions 66 formed on the confronting inner faces of the undercut in the jaw members. These cam followers 64 engage the planar cam faces $55^a$ of the cam element 55 during actuation and provide a line contact when spreading or contracting the jaw tips depending on which way the handle is rotated.

An elastic collar in the form of a rubber O-ring 70 normally maintains the jaws and cam followers on the cam surface during adjusting movement of the handle to open or close the tips of the jaws in a manner described below.

The clamping jaws are relatively easy to operate to position a hook in the tips 44,44 of the jaws 42. This is simply done by initially rotating the handle 53 in a direction to open the jaws for a given hook size. The user then positions the hook $H_f$ in the bite of the jaws and then rotates the handle 53 in a clockwise direction to press the tips 44 firmly against the hook $H_f$ and support it in the manner shown.

There is shown FIGS. 7–10, another embodiment of clamping jaw assembly and in accordance with the present invention. The jaw and cam arrangement are generally similar to the above-described embodiment and therefore like parts have the same reference numerals with an "a" subscript added.

The jaw assembly includes a pair of jaws $42_a, 42_a$ of elongated generally rectangular shape having pointed tips $44_a$ which clampingly engage the fishhook $H_f$, in the manner shown in the drawings. The rear terminal confronting interfaces of the jaws are undercut as at $46_a$ to define a shelf. These undercut portions have confronting opposing circular openings $50^a$ to receive the stub shaft of a cam element $55_a$. The jaws are normally held in a closed position by an adjustable clamping screw $54_a$ which engages through an opening $72_a$ adjacent the tip portions of the jaws and threads into a tapped opening in the complementary jaw. A spring normally biases the tips to an open position. Confronting circular pockets $80^a$ are provided in the undercut terminal end portions of the jaws for seating a spherical ball $82^a$ which is normally positioned to engage the cam surface $55_a$ in the manner shown in FIG. 9 when the parts are assembled.

Even though particular embodiments of the present invention have been illustrated and described herein, it is not intended to limit the invention and changes and modifications may be made therein within the scope of the following claims.

What is claimed is:

1. A device for rotating a shank of a fishhook about the longitudinal axis of the fishhook comprising: a mandrel rotatable about a predetermined axis of rotation; a base which includes means for rotatably mounting said mandrel; a first shaft extension, and means for pivotally mounting said first shaft extension on one end of said mandrel, said first shaft extension having a shaft axis which intersects the axis of rotation of said mandrel and is repositionable relative thereto; clamping means mounted on an outer end of said first shaft extension comprising jaws for gripping the fishhook; means normally biasing said jaws to an open position; a rotatable wedge having two planar surfaces at opposing angles which engage confronting arcuate surfaces on the interfaces of the jaws; and means maintaining the arcuate surfaces in engagement with the planar angled surfaces of the rotatable wedge whereby rotation of said wedge in one direction causes the tips of the jaws to close and rotation of said wedge in the opposite direction causes the tips of the jaws to open.

2. A device for rotating a shank of a fishhook about the longitudinal axis of the fishhook comprising: a mandrel rotatable about a predetermined axis of rotation; means for rotatably mounting said mandrel; a shaft and means for pivotaily mounting said shaft an one end of said mandrel; clamping means mounted on an outer end of said shaft comprising jaws for gripping the fishhook; means normally biasing said jaws to an open position; a rotatable wedge having two planar surfaces at opposing angles which engage confronting arcuate surfaces on the interfaces of the jaws; and means maintaining the arcuate surfaces in engagement with the planar angled surfaces of the rotatable wedge whereby rotation of said wedge in one direction causes the tips of the jaws to close and rotation of said wedge in the opposite direction causes the tips of the jaws to open.

3. A device for rotating a shank of a fishhook about the longitudinal axis of the fishhook comprising: a mandrel rotatable about a predetermined axis of rotation; means for rotatably mounting said mandrel; a shaft and means for pivotally mounting said shaft on one end of said mandrel: clamping means mounted on an outer end of said shaft comprising jaws for gripping the fishhook; means normally biasing said jaws to an open position; a rotatable wedge having two planar surfaces at opposing angles which engage confronting arcuate surfaces on the interfaces of the jaws; and means maintaining the arcuate surfaces in engagement with the planar angled surfaces of the rotatable wedge whereby rotation of said wedge in one direction causes the tips of the jaws to close and rotation of said wedge in the opposite direction causes the tips of the jaws to open, said jaws being in a fully locked position when the arcuate surfaces are aligned with the highest point on the wedge.

* * * * *